United States Patent
Chen et al.

(10) Patent No.: US 7,894,183 B2
(45) Date of Patent: Feb. 22, 2011

(54) SHIELDED AND INSULATED HEAT REMOVING SYSTEM

(75) Inventors: Guoying Chen, Shenzhen (CN); Guotao Liu, Shenzhen (CN); Dahui Zhu, Shenzhen (CN); Xunhua Xiao, Shenzhen (CN)

(73) Assignee: Shenzhen Mindray Bio-Medical Electronics Co., Ltd. (CN)

( * ) Notice: Subject to any disclaimer, the term of this patent is extended or adjusted under 35 U.S.C. 154(b) by 8 days.

(21) Appl. No.: 12/365,870

(22) Filed: Feb. 4, 2009

(65) Prior Publication Data

US 2009/0268403 A1 Oct. 29, 2009

(30) Foreign Application Priority Data

Apr. 25, 2008 (CN) .................. 2008 1 0066861

(51) Int. Cl.
*H05K 7/20* (2006.01)
(52) U.S. Cl. .................. 361/679.47; 361/714; 361/719; 361/816; 361/818; 257/713; 165/80.3
(58) Field of Classification Search ............ 361/679.46, 361/679.47, 679.48, 679.54, 690–697, 700, 361/701, 704–712, 714–719, 760, 724–727, 361/801, 803, 816, 818; 165/80.3, 104.33, 165/185, 121, 122, 126, 104.19, 104.21; 174/15.2, 16.3, 252, 355, 50.52, 35 MS, 35 R, 174/35 GC; 257/706–727
See application file for complete search history.

(56) References Cited

U.S. PATENT DOCUMENTS 5,175,613 A * 12/1992 Barker et al. ................ 257/713
5,880,930 A * 3/1999 Wheaton ..................... 361/690
5,949,648 A * 9/1999 Liao ........................... 361/700
6,025,991 A * 2/2000 Saito .......................... 361/704
6,347,035 B1 * 2/2002 Hamano et al. ......... 361/679.54
6,873,043 B2 * 3/2005 Oman ......................... 257/703

(Continued)

FOREIGN PATENT DOCUMENTS

CN 2790116 Y 6/2006

(Continued)

OTHER PUBLICATIONS

Search Report for Chinese Application No. 200810066861.4 dated Jun. 12, 2008.

(Continued)

*Primary Examiner*—Michael V Datskovskiy
(74) *Attorney, Agent, or Firm*—Vista IP Law Group, LLP.

(57) ABSTRACT

Various embodiments disclose a shielded or isolated heat dissipating system comprising a case, a heat sink base, and a circuit board comprising at least one electronic device for which heat dissipation is desired. The heat sink base is attached to the case and together with the shielding case defines an enclosed space within which electromagnetic interference is reduced. Both heat-dissipation function and electromagnetic shielding function may be achieved by the combination of the heatsink base and the case while maintain electrical isolation with one or more specially treated components. The space required for mounting the system may also be reduced without adversely affecting normal and stable operation of the electronic device.

20 Claims, 7 Drawing Sheets

U.S. PATENT DOCUMENTS

| | | | |
|---|---|---|---|
| 6,881,077 B2 * | 4/2005 | Throum | 439/76.1 |
| 7,073,960 B2 * | 7/2006 | Anderl et al. | 385/92 |
| 7,254,034 B2 * | 8/2007 | Bolle et al. | 361/719 |
| 7,314,318 B2 * | 1/2008 | Anderl et al. | 385/92 |
| 7,352,585 B2 * | 4/2008 | Mandel et al. | 361/714 |
| 7,564,128 B2 * | 7/2009 | Oman | 257/713 |
| 2002/0154487 A1 * | 10/2002 | Weischhoff Van Rijn | 361/719 |

FOREIGN PATENT DOCUMENTS

| | | | |
|---|---|---|---|
| CN | 1819755 A | 8/2006 | |
| CN | 1822759 A | 8/2006 | |
| JP | 2002093964 A | 3/2002 | |
| JP | 2003017879 A | 1/2003 | |
| JP | 2004158629 A | 6/2004 | |
| JP | 02007095967 A * | 4/2007 | |

OTHER PUBLICATIONS

"Shielding: Suffering from Heat Exhaustion" Laird Technologies, Jun. 2002.
"Design of Heat Dissipation and Electromagnetic Shielding of High Power Amplifier Array" Xie Tianyu. 2002. vol. 18. No. 4.
English Translation of Abstract for CN 2790116.
English Translation of Abstract for CN 1819755.
English Translation of Abstract for CN 1822759.
English Translation of Abstract for JP 2002093964.
English Translation of Abstract for JP 2003017879.
English Translation of Abstract for JP 2004158629.
English Translation of Abstract for "Design of Heat Dissipation and Electronagmetic Shielding of High Power Amplifier Array", Sep. 18, 2001.
English Translation of Abstract for "Shielding: Suffering from Heat Exhaustion", Jun. 2002.

* cited by examiner

SHIELDED AND INSULATED HEAT REMOVING SYSTEM

CROSS-REFERENCE TO RELATED APPLICATION

This application claims the benefit under Title 35, United States Code, §119(a)-(d) or §365(b) from Chinese Patent Application No. 200810066861.4 which was filed on Apr. 25, 2008 into State Intellectual Property Office of the People's Republic of China.

FIELD OF THE INVENTION

Various embodiments the invention relate to a shielded or insulated heat removing system.

BACKGROUND OF THE INVENTION

In today's electronic devices, heat dissipating structures or devices, e.g., heat sinks in some embodiments, are used for dissipating heat. Some electronic devices employ shielding cases for electromagnetic shielding. Some electronic devices adopt one or more insulating pads or components for electrical insulation. Nonetheless, each of these heat dissipating devices, electrical insulators, and electromagnetic shields usually serves one dedicated purpose. For example, heat sinks for central processing units (CPUs) or computer graphics cards used in existing computers generally only serve the purpose of dissipating heat from CPUs or the computer graphics cards. Similarly, metal shielding cases used in audio equipment generally serve only one purpose—electromagnetic shielding, and plastic sheets or fibrous boards are generally used in electronic apparatuses only for electrical insulation. These insulators do not serve the purpose of dissipating heat or providing electromagnetic shielding; these heat dissipating devices usually do not provide electrical insulation or electromagnetic shielding; and the electromagnetic shielding cases usually do not serve the purposes of dissipating heat or providing electrical insulation. Furthermore, in typical mechanical designs, aluminum studs are often used to, for example, provide structural support or attach screws. Nonetheless, aluminum is electrically conductive, and thus the aluminum studs may sometimes unavoidably or inadvertently connected with the circuit boards electrically and thus create electromagnetic interference. Such electromagnetic interference results in degradation in the output of the circuits. For example, in color Doppler ultrasound diagnostic systems, especially, the electromagnetic interference caused by the use of such aluminum studs is likely to cause continuous wave (CW) interference, which may result in significant interference with the output and thereby the quality of the output images.

SUMMARY OF THE INVENTION

An object of the present invention is to overcome the disadvantages found in the prior art by providing a shielded and insulated heat dissipating device which collectively serve at least two of the purposes of electromagnetic shielding, electrical isolation, and heat dissipating.

In some embodiments, a shielded and insulated heat dissipating device is provided, which comprises a electromagnetic shielding case, a base of the heat dissipating device, and a circuit board, at least one electronic device attached to the circuit board, for which heat dissipation may be desired, wherein the base of the heat dissipating device may be fixedly or removably attached to the electromagnetic shielding case and jointly defines an enclosed space with the electromagnetic shielding case to provide electromagnetic shielding for the electronic device and/or the circuit board. In some embodiments, electrical isolation is also provided between the circuit board and the electromagnetic shielding case and the base of the heat dissipating device.

In some embodiments, at least one of the electromagnetic shielding case and the base of the heat dissipating device comprises an electrically insulating surface which directly contacts the circuit board and provides electrical isolation.

In some embodiments, the shielding case comprises at least one first supporting stud which further comprises a first insulating surface The first supporting stud also serves to support the electromagnetic shielding case in some embodiments. The base of the heat dissipating device comprises at least one second supporting stud which further comprises a second insulating surface. The second supporting stud may be configured to support the base of the heat dissipating device in some embodiments. In some embodiments, the second insulating surface directly contacts the circuit board at a first point or in a first area, and the circuit board directly contacts the first insulating surface at a second point or in a second area.

In some embodiments, the first supporting stud comprises a first body, at least the top of which is prepared or made to provide electrical isolation, whereby the first insulating surface is formed on the top or other part(s) of the first body, the second supporting stud comprises a second body, at least the bottom or other part of which is prepared or made to provide electrical insulation, whereby the second insulating surface is formed on the bottom or other part(s) of the second body.

In some embodiments, the first body of the first supporting stud may be anodized and its top may be coated with an insulating varnish or other finishes or coatings providing electrical insulation (collectively insulating varnish), and the second body of the second supporting stud may be anodized, and its bottom or other part(s) may be coated with an insulating varnish or other finishes or coatings providing electrical insulation.

In some embodiments, there exist at least two first supporting studs and at least two second supporting studs, where the first insulating surfaces of the first supporting studs are co-planar with each other, and the second insulting surfaces of the second supporting studs are co-planar with each other.

In some embodiments, the electromagnetic shielding case comprises vent holes which do not negatively impact the electromagnetic shielding functions of the electromagnetic shield case.

In some embodiments, the electromagnetic shielding case, the circuit board, and the base of the heat dissipating device are assembled together as a separable assembly. In some embodiments, the electromagnetic shielding case and the base of the heat dissipating device are joined together to form an inseparable part using techniques such as welding, soldering, brazing, bonding, gluing, or other similar techniques.

In some embodiments, at least one of the second supporting studs comprise a threaded recess axially extending through the second supporting stud. The base of the heat dissipating device may comprise a second threaded recess at a corresponding location for assembly purposes in some embodiments. In some embodiments, the electromagnetic shielding case comprises a first threaded recess at a corresponding location for assembly purpose. In some embodiments, the circuit board comprises an aperture at a corresponding location for assembly purpose. In some embodiments during assembly, a screw type fastener goes through the second threaded recess, the threaded recess, the aperture, and the first threaded recess in sequence.

In some embodiments, a powered blower or a powered fan (collectively blower) is provided on one side of the base of the heat dissipating device to provide forced convection flow through the heat dissipating device so as to further assist heat dissipation.

In some embodiments, the base of the heat dissipating device comprises a lower surface which faces towards the circuit board and an upper surface which faces away from the circuit board, where a thermal conductive medium, such as a thermal grease or a thermal compound (collectively thermal conductive medium), may be applied to the lower surface which is in direct contact with the electronic device for which heat dissipation is desired.

In some embodiments, the upper surface of the base of the heat dissipating device is connected to, attached to, or otherwise integrated with (collectively, connected to) at least one heat pipe which is further connected to, attached to, or otherwise integrated with a plurality of fins, pins, or other types of geometrical shapes of the heat sink to increase surface area for heat dissipation by forced or natural convection. In some embodiments, a blower or a fan may be added to increase air flow through the plurality of fins, pins, or other types of geometrical shapes of the heat sink to further enhance heat dissipation. In some embodiments, instead of or in addition to the mechanism for natural or forced convection as described above, the heat dissipating device may comprise liquid cooling device to further enhance heat dissipation.

Various embodiments may achieve various purposes or serve various functions. The following comprises some exemplary purposes or functions that may be achieved or served by some embodiments.

1) Both heat-dissipating function and electromagnetic shielding function may be achieved by the use of the base of the heat dissipating device and the electromagnetic shielding case in some embodiments. In these embodiments, since the circuit board is insulated with respect to both the base of the heat dissipating device and the electromagnetic shielding case, electromagnetic interference to the enclosed electronic circuits may be lessened significantly or even completely avoided by the insulating function. Some embodiments may achieve the electromagnetic shielding, electrical isolation, and heat dissipation at the same time. In some embodiments, the space required for mounting the system may be reduced due to the compactness of the overall design, and/or the use of the base of the heat dissipating device as part of the electromagnetic shielding case.

2) In some embodiments, by treating at least part of the first and the second supporting studs so as to provide electrical insulation function as described in the previous paragraphs, the heat dissipating system may be used in a high operating temperature environment.

3) In some embodiments, by applying the thermal conductive medium between the base of the heat dissipating device and the electronic circuit or device, the heat generated by the electronic device may be transferred to heat sink base more effectively.

4) In some embodiments, the use of the heat pipe, the plurality of fins, pins, or other geometrical shapes for the heat sink, the blower/fan, and/or the liquid cooling device, may enhance heat transfer.

BRIEF DESCRIPTION OF THE DRAWINGS

The drawings illustrate the design and utility of various embodiments of the invention, in which similar elements are referred to by common reference numerals. In order to better appreciate how advantages and objects of various embodiments of the inventions are obtained, a more particular description of various embodiments of the inventions briefly described above will be rendered by reference to specific embodiments thereof which are illustrated in the accompanying drawings. Understanding that these drawings depict only typical embodiments of the invention and are not therefore to be considered limiting its scopes the invention will be described and explained with additional specificity and detail through the use of the accompanying drawings.

DETAILED DESCRIPTION

As shown in FIGS. 1 to 7, an electromagnetically shielded and electrically insulated heat dissipating system according to one embodiment comprises a electromagnetic shielding case 1, a heat sink base 3, and a circuit board 2 which comprises at least one electronic device 4 for which heat dissipation is desired. The base of the heat dissipating device 3 may be fixedly or removably attached to the electromagnetic shielding case 1 and jointly defines an electromagnetically shielded space 15 with the electromagnetic shielding case 1 to provide electromagnetic shielding within the enclosed space in some embodiments. The circuit board 2 is disposed inside the electromagnetic shielded space 15, with the circuit board 2 being electrically insulated from both the electromagnetic shielding case 1 and the base 3 of the heat dissipating device. In some embodiments, the electromagnetic shielding case encompasses or accommodates a part of the electronic device, wherein electromagnetic shielding or reduction or elimination of electromagnetic interference is desired for the part of the electronic device. In some embodiments, the electromagnetic shielding case encompasses or accommodates the electronic device in its entirety.

Figure 1:
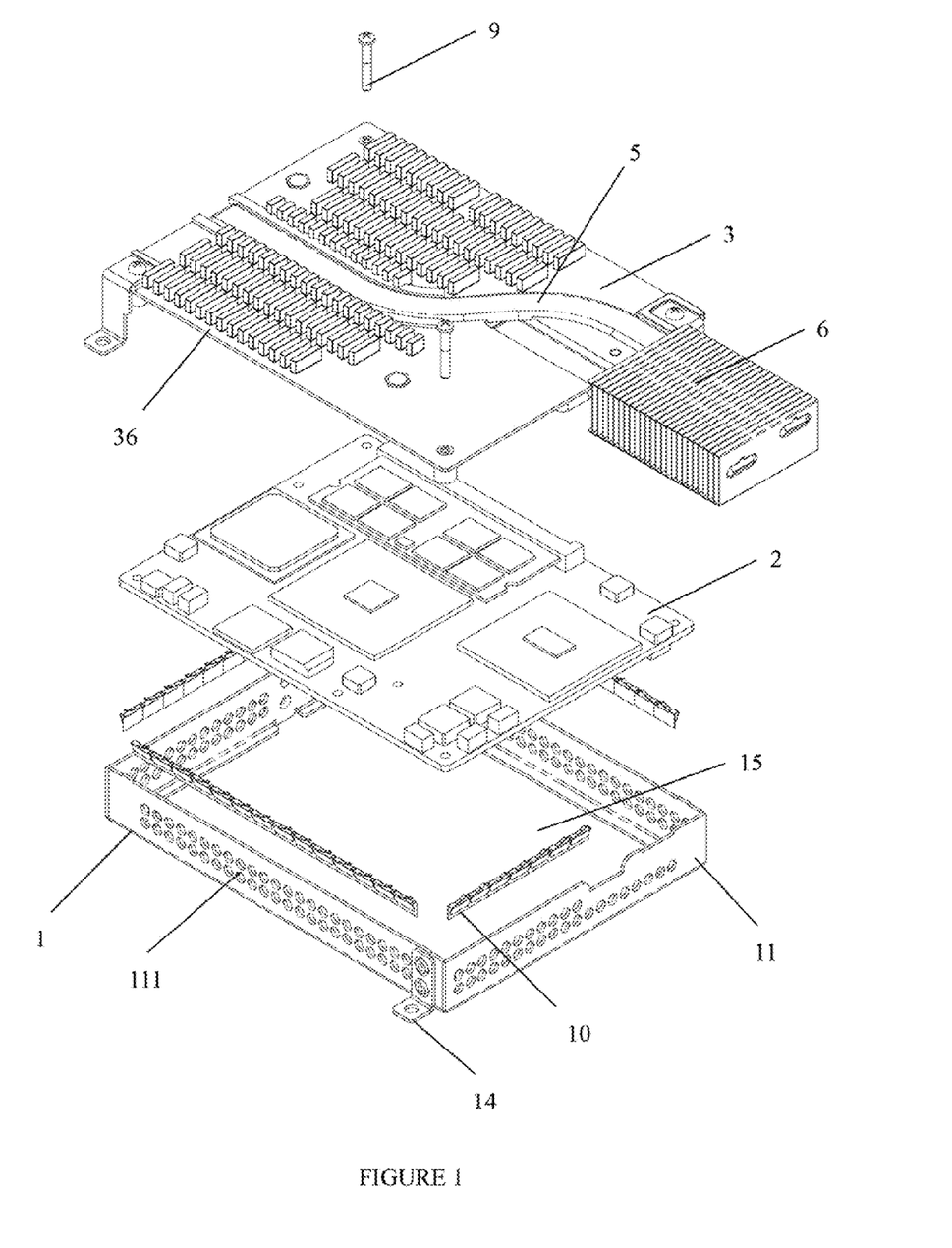
FIG. 1 illustrates an exploded perspective view of a electromagnetically shielded and electrically insulated heat dissipating system according to some embodiments.
Figure 2:
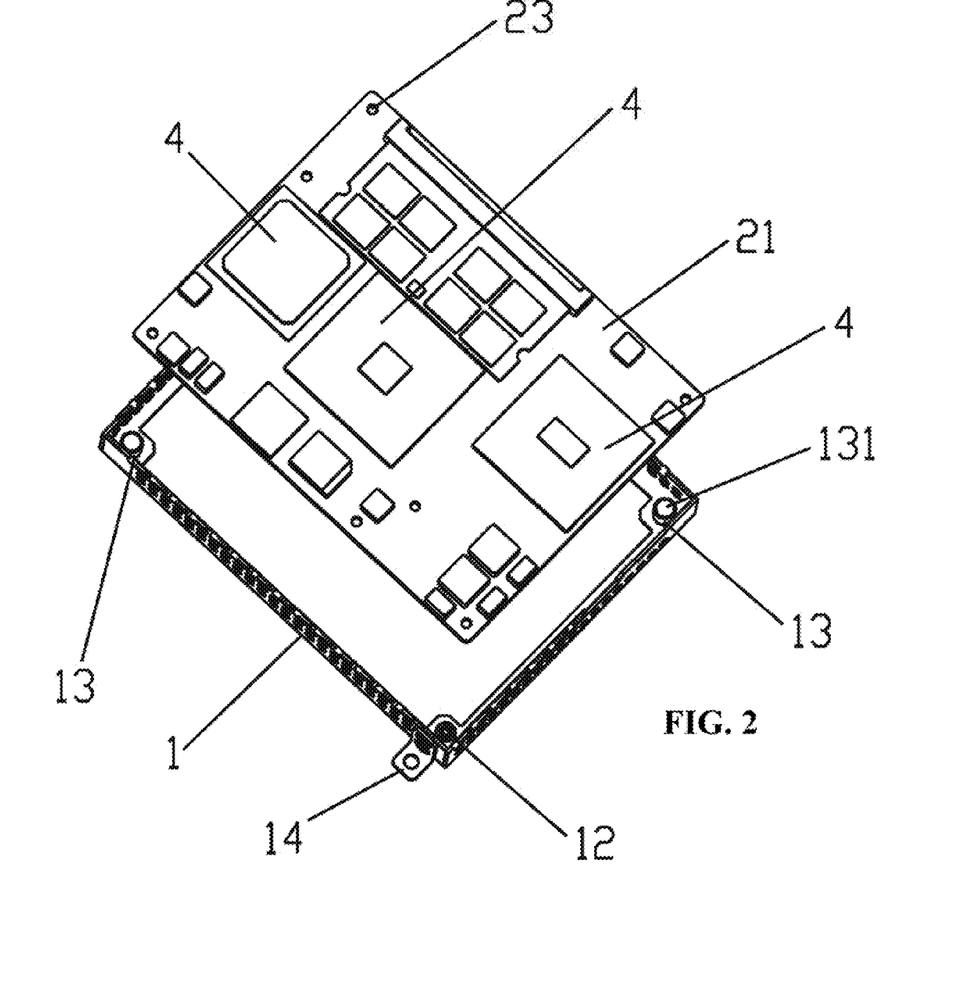
FIG. 2 illustrates a schematic view of a circuit board and an electromagnetic shielding case of the electromagnetically shielded and electrically insulated heat dissipating system according some embodiments before final assembly.

The electromagnetic shielding case 1 comprises, in some embodiments, a body which comprises a box structure formed by four contiguous sidewalls 11. Each of the sidewalls 11 may comprise vent holes 111 for removing heat by circulating air in and out of the case in some embodiments to meet operating and/or safety requirements. In some embodiments, two first screw holes 12 and two first supporting studs 13 are provided at the four corners inside the electromagnetic shielding case 1. In some embodiments, the two first screw holes 12 are located on a diagonal line of the electromagnetic shielding case 1, while the two first supporting studs 13 are located on another diagonal line of the electromagnetic shielding case 1. In some embodiments, one or more L-shaped mounting flaps or brackets 14 are attached to, formed, or somehow integrated with the electromagnetic shielding case 1 at or near the one or more corners on the outside of the electromagnetic shielding case 1. In some embodiments, the two first supporting studs 13 are parallel to each other and extend upwardly in a vertical or substantially vertical direction. One of ordinary skill in the art would clearly know that a feature may be in a substantially vertical direction even though it is designed or intended to be in a perfectly vertical direction due to manufacturing allowances or tolerances. Each of the first supporting studs 13 comprises a body which, in sonic embodiments, may be anodized and may further be coated or treated with an insulating varnish or other finishes or coatings providing electrical insulation on its top surface or other part(s) so that the top or the treated surface of each first supporting stud 13 forms a first insulating supporting surface 131 which directly contacts the circuit board 2 in some embodiments. In some embodiments, the first supporting surfaces 131 of the two first supporting studs 13 are co-planar or substantially coplanar with each other. One of ordinary skill in the art would clearly know that two features may be substantially coplanar with each other even though they are designed or intended to be perfectly coplanar with each other due to manufacturing allowances or tolerances. It is understood to one of ordinary skill in the art that, although two first supporting studs are shown, there may exist only one first supporting stud or more than two first supporting studs instead.

Figure 5:
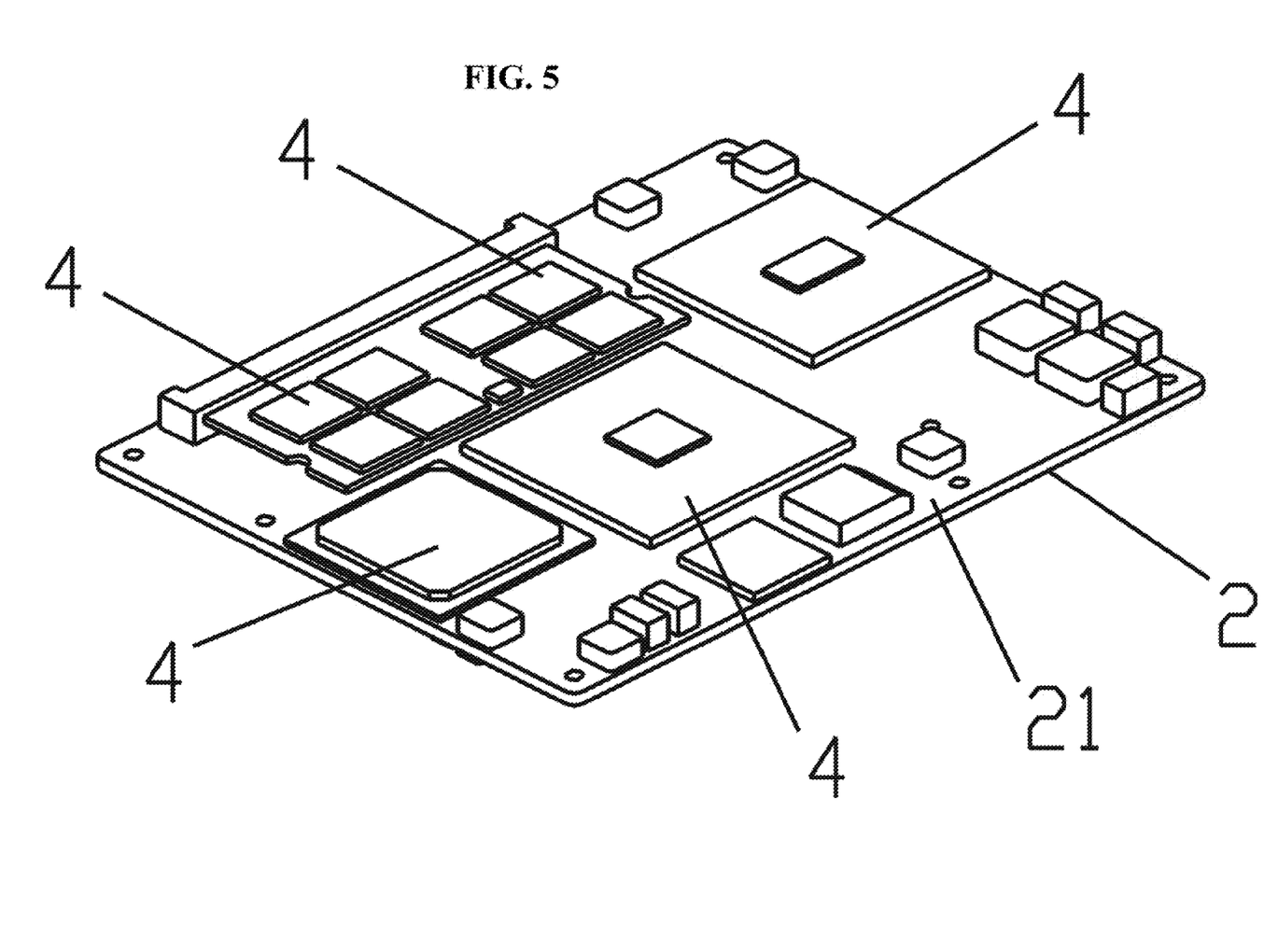
FIG. 5 illustrates a perspective view of the circuit board of the electromagnetic shielded and electrically insulated heat dissipating system according some embodiments.

In some embodiments, the circuit board 2 comprises a first upper surface 21 and an opposite first lower surface 22. The first upper surface 21 faces towards the base 3 of the heat dissipating device, while the first lower surface 22 faces towards the electromagnetic shielding case 1 in some embodiments. Two apertures 23 are formed through both the first upper surface 21 and the first lower surface 22 in some embodiments. The two apertures 23 are located, in some embodiments, on the diagonal line of the shielding case where the two first screw holes 12 of the shielding case 1 are arranged so that the two apertures 23 are aligned with the two first screw holes 12 respectively. The two apertures 23 serve a plurality of function which comprise mounting and securing the circuit board without adversely affecting the electronic circuits of the circuit board by, for example, causing electromagnetic interference due to undesired contact with metallic components in the case or in the supporting structures In some embodiments, the first upper surface 21 of the circuit board 2 is configured to accept or accommodate at least one electronic device 4 from which heat dissipation is desired. In various embodiments, the electronic device 4 comprises a high power chip, such as a CPU chip, a computer graphics chip, a memory chip, or the like.

Figure 3:
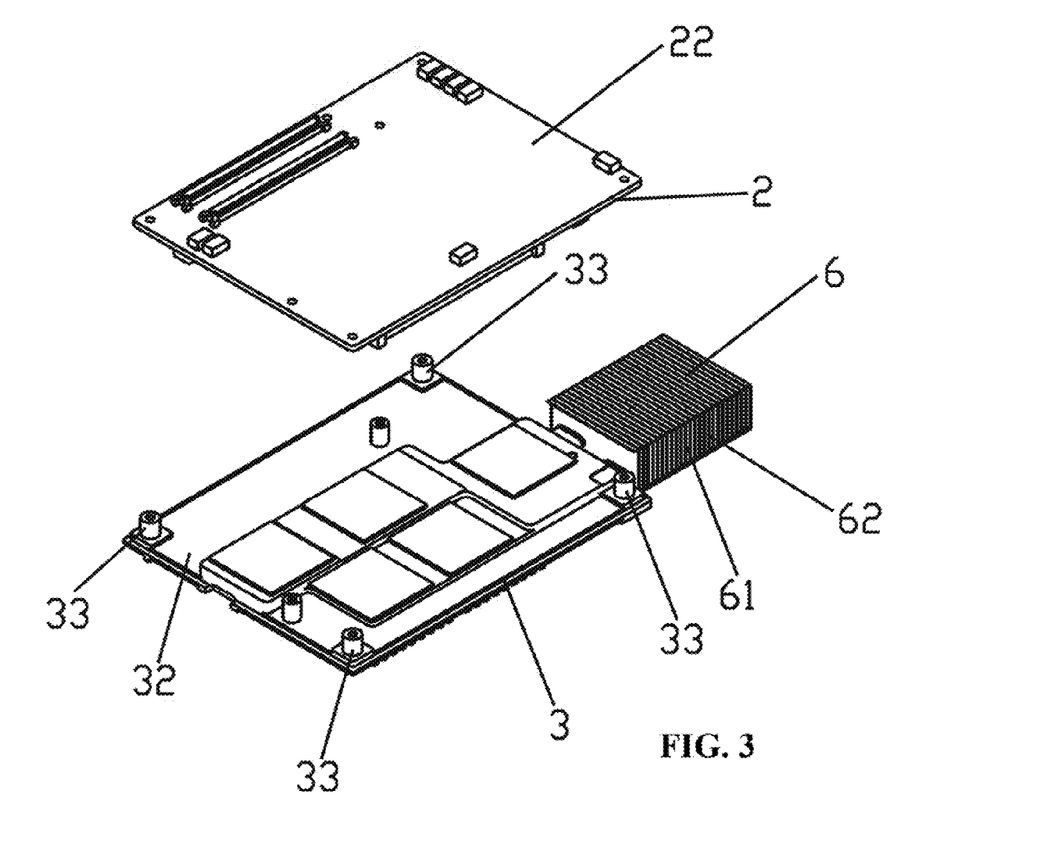
FIG. 3 illustrates a schematic view of the circuit board and a base of the heat dissipating device of the electromagnetically shielded and electrically insulated heat dissipating system according some embodiments before final assembly.
Figure 4:
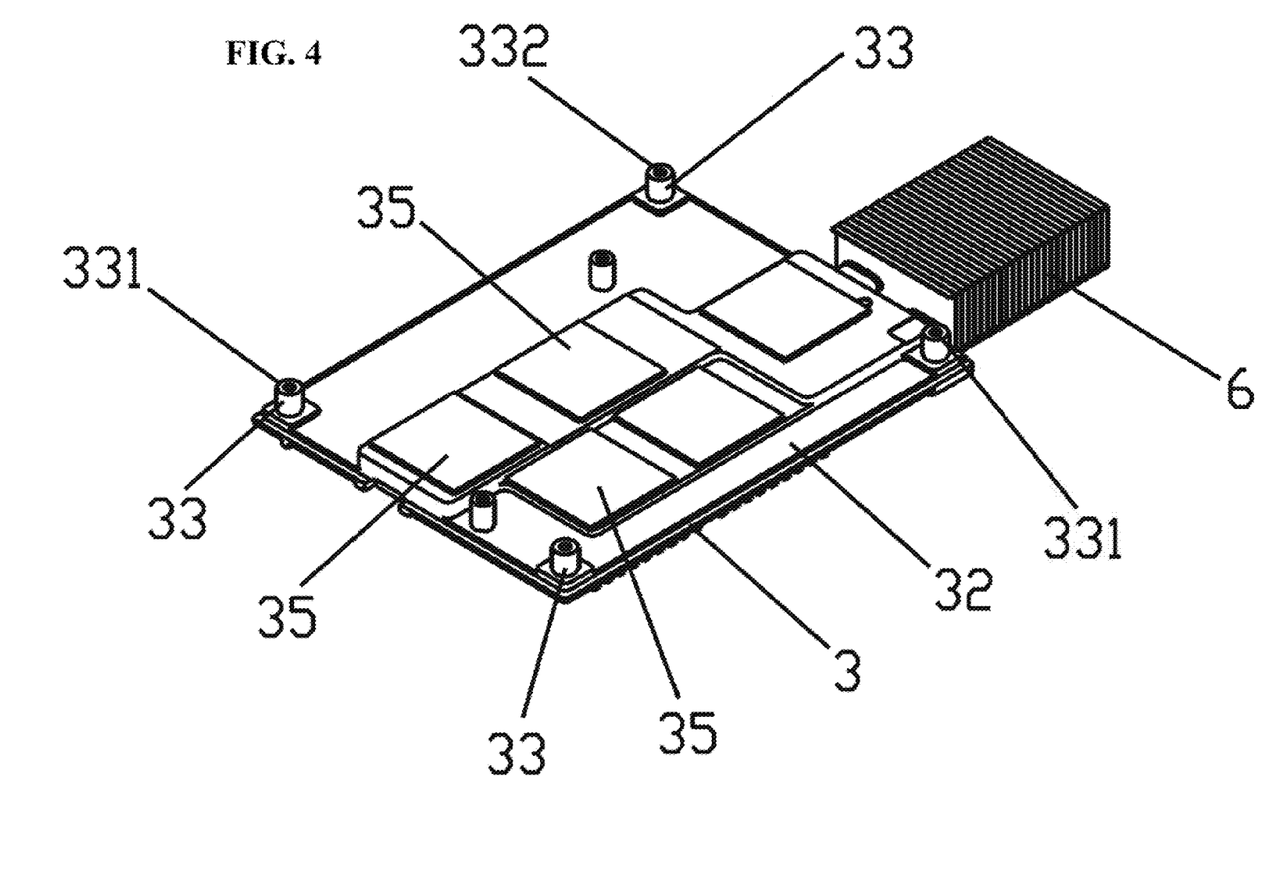
FIG. 4 illustrates a perspective view of the base of the heat dissipating device of the electromagnetically shielded and electrically insulated heat dissipating system according some embodiments.
Figure 6:
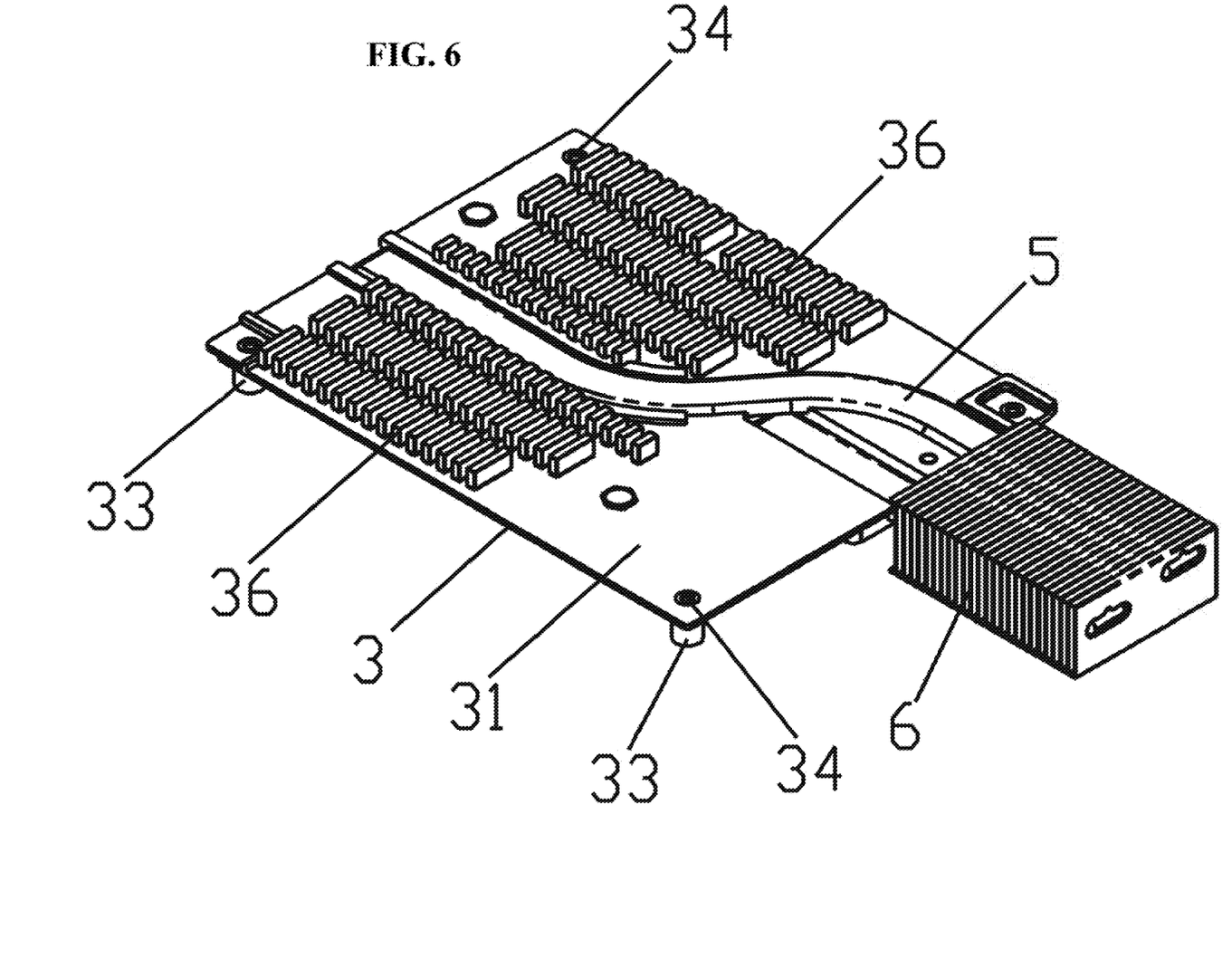
FIG. 6 illustrates a perspective view of the base of the heat dissipating device of the electromagnetically shielded and electrically insulated heat dissipating system according some embodiments.

In some embodiments, the base 3 of the heat dissipating device comprises a metal plate or other similar geometrical shapes which comprise a second upper surface 31 and a composite second lower surface 32. In these embodiments, the second upper surface 31 faces away from the circuit board 2, and the second lower surface 32 faces towards the circuit board 2. The second lower surface 32 comprises four corners, a second supporting stud 33 being attached to or otherwise integrated with each of the corners respectively in some embodiments. The four second supporting studs 33 are parallel to each other and extend downwardly in a vertical or substantially vertical direction in some embodiments. One of ordinary skill in the art would clearly know that a feature may be in a substantially vertical direction even though it is designed or intended to be in a perfectly vertical direction due to manufacturing allowances or tolerances. Each of the second supporting studs 33 comprises a metal body which may be anodized and may further be coated with an insulating varnish or other finishes or coatings providing electrical insulation function on its bottom surface or other part(s) so that the bottom surface or the other part(s) of each second supporting stud 33 forms a second insulating supporting surface 331 which directly contacts the circuit board 2 in some embodiments. The second supporting surfaces 331 of the four second supporting studs 33 are co-planar or substantially coplanar with each other in some embodiments. One of ordinary skill in the art would clearly know that two features may be substantially coplanar with each other even though they are designed or intended to be perfectly coplanar with each other due to manufacturing allowances or tolerances. Of the four second supporting studs 33, two second supporting studs 33, which are located on a diagonal line of the base 3 of the, heat dissipating device, are each formed with a threaded hole 332: The base 3 of the heat dissipating device is also formed with second threaded holes 34, which extend through the second upper surface 31 and the second lower surface 32, at positions corresponding to the two threaded holes 332 in some embodiments. A plurality of heat conductive medium sections 35 having high heat conductivity are provided on an inner part of the second lower surface 32 of the heat sink base 3 inwardly from the four corners of the second lower surface in some embodiments. The beat conductive medium sections 35 may be, in some embodiments, arranged in accordance with the electronic device 4 on the circuit board 2 from which the heat dissipation is desired. The heat conductive medium may be, for example, ceramic-based thermal compound such as heat conductive silicone compound with low thermal resistance or high thermal conductivity, metal-based thermal compound, carbon-based, or liquid metal based. Although four second supporting studs are shown in the figures, one of ordinary skill in the art would clearly understand that there may be only one, two, or any number of second supporting studs. In addition or in the alternative, although two second supporting studs 33 are illustrated to provide threaded holes 332, one of ordinary skill in the art would clearly understand that one, two, or any number of second supporting studs may be formed to provide threaded holes 332 in various embodiments. In some embodiments, neither of the second supporting studs is formed with a threaded hole so that the second supporting studs do not provide the function of connecting the circuit board and the base 3 of the heat dissipating device.

Figure 7:
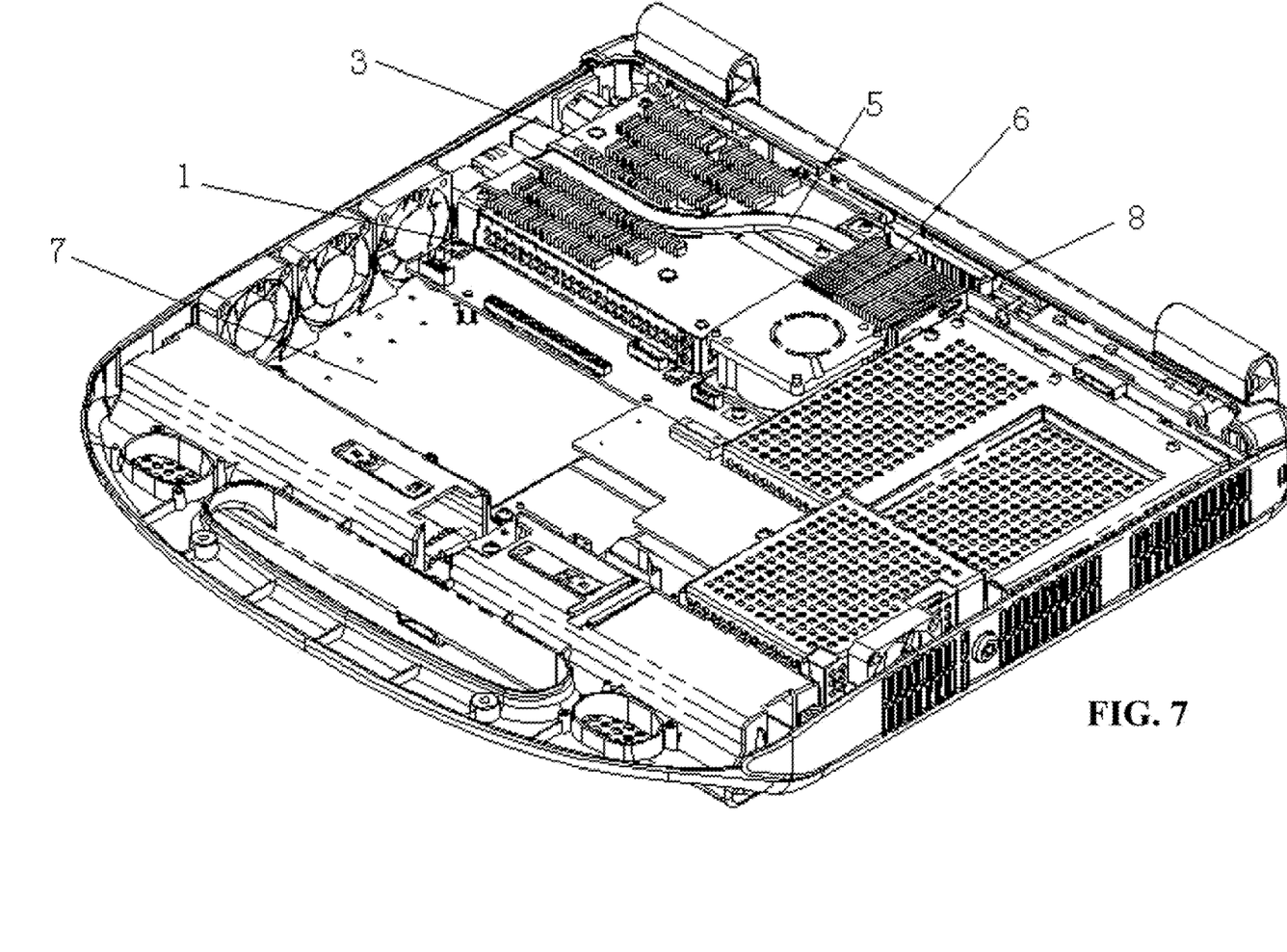
FIG. 7 illustrates a schematic view of the electromagnetically shielded and electrically insulated beat dissipating system according some embodiments when installed on a frame casing.

In some embodiments, the second upper surface 31 or other part(s) of the base 3 of the heat dissipating device comprises a plurality of protrusions or geometric shapes 36 for increasing surface area for heat dissipation. In some embodiments, the second upper surface 31 of the base 3 of the heat dissipating device may comprise or may be integrated with a heat pipe 5 which may be further connected to a set 6 of fins, pins, or other geometric shapes 61. In some embodiments, air flow slots 62 are formed between neighboring fins, pins, or other geometric shapes 61. In some embodiments, the air flow slots 62 face toward a blower or a fan 8 on a frame casing 7 to enhance convective heat transfer.

In some embodiments, the first supporting studs 13 and the second supporting studs 33 may both be anodized. In some embodiments, the first supporting studs 13 and the second supporting studs 33 are coated with an insulating varnish or other finishes or coatings providing electrical isolation on their end surfaces or other part(s). In some embodiments, the insulating varnish or other finishes or coatings providing electrical isolation may undergo high temperature baking or other similar curing processes so as to enhance the bonding between the insulating varnish, finish, or coating and the end surfaces or the other part(s) of the second supporting studs. In some embodiments, the insulating function does not degrade so as to adversely affect the intended purposes of these supporting studs even after multiple times of assembly and disassembly of the heat dissipating system. In some embodiments, the insulating varnish, finish, or coating which is capable of withstanding high temperature, e.g., 250~300° C., may be used so that the supporting studs 13 and 33, which are coated with the insulating varnish, finish, or coating after anodization may be used in a high temperature environment. In the alternative, the supporting studs may only receive an anode oxidization treatment or are only coated with an insulating varnish, finish, or coating.

In some embodiments, during the assembly of the heat dissipating system, the electromagnetic shielding case 1 may be fixedly or removably attached or connect to or otherwise integrated with the frame casing 7 using fasteners through the L-shaped mounting brackets 14 on the metal shielding case 1 and into the frame casing 7. In some embodiments, two fasteners 9 may be inserted through or into the two second threaded recess 34 of the base 3 of the heat dissipating device, the threaded recesses 332 of the two second supporting studs 33, the two apertures 23 of the circuit board 2, and the two first threaded recesses 12 of the electromagnetic shielding case 1 in sequence, to secure the base 3 of the heat dissipating device, the circuit board 2, and the electromagnetic shielding case 1 together in some embodiments. One of ordinary skill in the art would certainly appreciate the fact that these components may also be assembled or joined together by other means or techniques. In some embodiments, a good contact between the base 3 of the heat dissipating device and the electromagnetic shielding case 1 may be achieved by a metal spring plates 10 with a first elastic constant. In some embodiments, the first lower surface 22 of the circuit board 2 is pressed against the first supporting surfaces 131 of the two first supporting studs 13 of the electromagnetic shielding case 1, and the second supporting surfaces 331 of the four second supporting studs 33 of the heat sink base 3 are pressed against the first upper surface 21 of the circuit board 2 so that the circuit board 2 is electrically isolated from the shielding case 1 and the base 3 of the heat dissipating device. During operation, the heat generated and emitted by the electronic device 4 may be more effectively transferred to the base 3 of the heat dissipating device via the heat conductive medium sections 35, and then the heat may be transferred to the plurality of fins, pins, or other geometric shapes 61 through the heat pipe 5 by air or liquid flow. In some embodiments, the hot air around the fins, pins, or other geometric shapes may be forced to circulate to the outside of the frame casing 7 by the blower or fan 8. In these embodiments, heat is removed by convective heat transfer due to the circulation of air and/or coolant.

In some embodiments for the electromagnetic shielded and electrically insulated heat dissipating system, the electromagnetic shielding case comprises a body. The material for forming or manufacturing the electromagnetic shielding case may comprise copper, aluminum, iron, galvanized steel sheet (SECC), cold rolled steel sheet (SPCC), or other similar materials. In some embodiments, the material for the electromagnetic shielding case may comprise other non-metallic materials so long as the design requirements for electromagnetic shield, heat dissipation, and/or electrical isolation are met. In some embodiments, the base 3 of the heat dissipating device also comprises a body which may constitute at least part of the base 3 of the heat dissipating device and may be made from the material of copper, aluminum, or other metals or alloys with a good thermal conductivity. The sizes and the shapes of the electromagnetic shielding case and the base of the heat dissipating device may be designed in various ways as to meet the above requirements. In some embodiments, the first supporting studs or the second supporting studs may be made of aluminum, copper, iron, stainless steel, or other materials so long as the selected material satisfies various design requirements. In some embodiments, the heat conductive medium may be a thermal compound with a low thermal resistance or high thermal conductivity, or any other materials whose thermal conductivity is above certain design threshold value so as to be capable of effectively transferring the heat generated by the electronic device to the base of the heat dissipating device.

In some embodiments of the electromagnetically shielded and electrically isolated heat dissipating system, the base 3 of the heat dissipating device is fixedly or removably attached to, attached to, or otherwise integrated with the electromagnetic shielding case 1, and jointly defines the shielded space 15 together with the electromagnetic shielding case 1. In these embodiments, the shielded space 15 accommodates the circuit board 2. In some embodiments, the circuit board 2 is isolated from both the base 3 of the heat dissipating device and the electromagnetic shielding case 1. In some embodiments, such electrical isolation may be achieved by one of the following ways:

1) In some embodiments, the circuit board is supported inside the shielded space 15 by one or more additional elements which are independent from the base 3 of the heat dissipating device and the electromagnetic shielding case so that the circuit board is isolated from the electromagnetic shielding case and the base of the heat dissipating device by thermal convection and/or conduction and, to a lesser degree, radiation.

2) In some embodiments, only one of the base of the heat dissipating device and the electromagnetic shielding case directly contacts the circuit board; for example, the circuit board may be supported by a first insulated supporting surface provided on the shielding case, and electrical isolation may be achieved by the air gap existing between the circuit board and the base of the heat dissipating device.

3) In some embodiments, both the base of the heat dissipating device and the electromagnetic shielding case directly contact the circuit board. For example, in some embodiments, the electromagnetic shielding case comprises a first insulated supporting surface which directly contacts the circuit board, and the base of the heat dissipating device comprises a second insulated supporting surface which directly contacts the circuit board, with the circuit board being interposed between the first and second supporting surfaces.

Regarding the supporting surface provided on the electromagnetic shielding case, it may be formed or situated atop a supporting stud in some embodiments. The supporting stud may comprise an insulating material providing electrical isolation functions, or by a metal or metallic material which withstands high operating temperature in some embodiments. When this supporting stud is formed by a metal or metallic material, at least the top or some other part(s) of the supporting stud may be treated or prepared to provide such electrical isolation functions so as to form one or more insulated supporting surface.

With regard to the supporting surface provided on the base of the heat dissipating device, in some embodiments the supporting surface may be formed or prepared on or near the bottom of a supporting stud. The supporting stud may be formed or prepared by using a material that provides electrical isolation functions, or by a metal or metallic material which withstands high operating temperature in some embodiments. When this supporting stud is formed, prepared, or otherwise manufactured by using a metal or metallic material, at least the bottom or the part(s) near the bottom of the supporting stud may receive an insulating treatment so as to form an electrically isolated supporting surface in some embodiments.

In some embodiments of the electromagnetic shielded and electrically isolated heat dissipating system, the circuit board may be fixedly or removably attached to or otherwise integrated with both the electromagnetic shielding case and the base of the heat dissipating device. In some embodiments, the circuit board may be fixedly or removably attached to or otherwise integrated with only one of the electromagnetic shielding case and the base of the heat dissipating device. In some embodiments, the mounting or securing of the circuit board may be independent of the electromagnetic shielding case and the base of the heat dissipating device.

In some embodiments of the electromagnetically shielded and electrically isolated heat dissipating system, the heat generated by the electronic device on the circuit board during operation may be removed or transferred away only by or through the base of the heat dissipating device. In some embodiments, additional components or materials may be used for enhancing the heat dissipation. In some embodiments, the additional components or materials comprise heat conductive medium sections which may be provided on one side of the base of the heat dissipating device facing towards the circuit board, or at least one heat pipe situated on one side of the base of the heat dissipating device facing away from the circuit board. In some embodiments, the heat pipe is connected to a set of fins, pins, or other geometric shapes which face a blower or a fan. In some embodiments using the heat pipe, the shape of the heat pipe may be designed based at least upon the heat dissipation requirement. In some embodiments, the heat pipe may have a round or flat tube shape. When the amount of the heat to be dissipated is large, the heat dissipating device may comprise two or more heat pipes in some embodiments.

In the electromagnetic shielded and electrically isolated heat dissipating system, both heat-dissipation function and electromagnetic shielding function may be achieved by a combination of the heat sink base and the electromagnetic shielding case in some embodiments. Since the circuit board is isolated from both the base of the heat dissipating device and the electromagnetic shielding case, the electromagnetic interference to the electronic circuits enclosed therein may be reduced or even completely avoided due to the electrical isolating function or the electromagnetic shielding function provided by some embodiments of the invention. The objectives regarding electromagnetic shielding, electrical isolation, and heat dissipation may be achieved at the same time in some embodiments. The space required for mounting the system may be reduced in some embodiments.

Various embodiments of the electromagnetically shielded and electrically isolated heat dissipating system may be used in portable color Doppler ultrasound diagnostic systems to provide electrical isolation, electromagnetic shielding, and/or heat dissipation for the board with one or more central processing units in a narrow space. Various embodiments of the heat dissipation system may be used in robotic motion control devices, medical and diagnostic equipment, automatic control devices, video editing and production equipment, medical imaging equipment, industrial and scientific instrument, measuring and metering equipment, electromechanical microscopic and imaging systems, computer graphing devices, or similar equipment or instruments to provide electrical isolation, electromagnetic shielding, and/or heat dissipation for the electronic devices on the circuit boards enclosed therein.

Other aspects and features of the invention will be evident from reading the following detailed description of the preferred embodiments, which are intended to illustrate, not limit, the invention. Although particular embodiments of the present inventions have been shown and described, it will be understood that it is not intended to limit the present inventions to the preferred embodiments, and it will be obvious to those skilled in the art that various changes and modifications may be made without departing from the spirit and scope of the present inventions. The specification and drawings are, accordingly, to be regarded in an illustrative rather than restrictive sense. The present inventions are intended to cover alternatives, modifications, and equivalents, which may be included within the spirit and scope of the present inventions as defined by the claims.

What is claimed is:

1. A shielded and isolated heat dissipating system, the system comprising:
    a case accommodating at least a part of the heat dissipating system;
    at least one electronic device for which heat dissipation is desired; and
    a heat dissipating device which comprises a base at least part of which is thermally connected to a surface of the at least one electronic device, wherein
        the base together with the case define a space within which electromagnetic interference is reduced, and
        the at least one electronic device is situated within the space; and
    a plurality of supporting studs that are attached to the case on one end of each of the plurality of supporting studs and support the at least one electronic device in the space on another end of the each of the plurality of supporting studs for electrical isolation.

2. The shielded and isolated heat dissipating system of claim 1, wherein at least one of the case and the base comprises an electrically isolating surface which directly contacts a circuit board to which the at least one electronic device is attached.

3. The shielded and isolated heat dissipating system of claim 2, wherein
    the case comprises at least one first supporting stud,
    the first supporting stud comprises a first insulating surface,
    the base comprises at least one second supporting stud,
    the second supporting stud comprises a second insulating surface,
    the second insulating surface directly contacts the circuit board, and
    the circuit board directly contacts the first insulating surface.

4. The shielded and isolating heat dissipating system of claim 3, wherein
    the first supporting stud comprises a first metal body,
    at least a top portion of the first metal body receives an insulating treatment, whereby
        the first insulating surface is formed on or near the top portion of the first metal body, the second supporting stud comprises a second metal body, and at least a bottom portion of the second metal body receives the insulating treatment or another similar insulating treatment, whereby the second supporting surface is formed on or near the bottom portion of the second metal body.

5. The shielded and isolated heat dissipating system of claim 4, wherein at least a part of the first metal body of the first supporting stud is anodized, with a top portion coated with an insulating varnish, and the second metal body of the second supporting stud is anodized with a bottom portion coated with the insulating varnish or a similar insulating varnish.

6. The shielded and isolated heat dissipating system of claim 4, wherein the shielded and isolated heat dissipating system comprises at least two first supporting studs and at least two second supporting studs, in which the first supporting surfaces of the at least two first supporting studs are substantially coplanar with each other, and the second supporting surfaces of the at least two second supporting studs are substantially coplanar with each other.

7. The shielded and isolated heat dissipating system of claim 3, wherein the case, the circuit hoard, and the base are fixedly or removably joined together.

8. The shielded and isolated heat dissipating system of claim 7, wherein at least one of the second supporting studs comprises a threaded recess, the base comprises a second threaded recess at a location corresponding to the threaded recess, the case comprises a first threaded recess at a location corresponding to the threaded recess, the circuit board is provided with an aperture at a location corresponding to the threaded recess, and a fastener inserts through the second threaded recess, the threaded recess, the aperture, and the first threaded recess in sequence.

9. The shielded and isolating heat dissipating system of claim 1, wherein the case comprises one or more vent holes without negatively impacting an electromagnetic shield function of the case.

10. The shielded and isolated heat dissipating system of claim 1, further comprising a blower on at least one side of the base.

11. The shielded and isolated heat dissipating system of claim 10, wherein the base comprises a lower surface facing towards the circuit board and an upper surface facing away from the circuit board, and a thermal conductive medium is applied to at least a part of the lower surface corresponding to the electronic device to transfer heat generated by the electronic device.

12. The shielded and isolated heat dissipating system of claim 10, wherein the upper surface of the base is connected to at least one heat pipe which is connected to a plurality of fins with an air flow slot defined by two adjacent fins, and the blower is situated with respect to the air flow slot to enhance heat transfer.

13. The shielded and isolated heat dissipating system of claim 1, wherein the each of the plurality of supporting studs comprises a length and a surface, on which the at least one electronic device resides, to separate the at least one electronic device from the case for the electrical isolation.

14. The shielded and isolated heat dissipating system of claim 1, wherein a contact surface of the another end of the each of the plurality of supporting studs that supports the at least one electronic device is treated with a process to provide the electrical isolation between, the at least one electronic device and case.

15. The shielded and isolated heat dissipating system of claim 14, the process comprising an anodization process for at least the contact surface of the another end of the each of the plurality of supporting studs or a manufacturing process that forms an insulating layer on at least the contact surface.

16. The shielded and isolated heat dissipating system of claim 1, wherein the heat dissipating device dissipates heat via convective heat transfer.

17. An apparatus for dissipating heat and reducing electromagnetic interference, the apparatus comprising:

a case accommodating at least a part of the shielded and isolated heat dissipating apparatus;

a heat dissipating device which comprises a base at least part of which is thermally connected to a surface of at least one electronic device for which heating dissipation and electromagnetic interference reduction are desired, wherein the base together with the case define a space within which the electromagnetic interference is reduced, and at least a parr of the at least one electronic device, for which the heat dissipation and the electromagnetic interference reduction are desired, is situated within the space; and a plurality of supporting studs that are attached to the case on one end of each of the plurality of supporting studs and support the at least one electronic device in the space on another end of the each of the plurality of supporting studs, wherein the each of the plurality of supporting studs comprises a length and a surface, on which the at least one electronic device resides, to separate the at least one electronic, device from the case for electrical insulation.

18. The apparatus for dissipating heat and reducing electromagnetic interference of claim 17, further comprising a blower that is situated on at least one side of the base to dissipate heat generated by the at least one electronic device.

19. A method for providing heat dissipation and reduction of electromagnetic interference for an electronic device, comprising:

thermally coupling at least a part of the electronic device with a base of a heat dissipating device, wherein heat generated by the electronic device is dissipated from the at least the part of the electronic device through at least the base;

accommodating at least a part of the electronic device in the case by using a plurality of supporting studs; and forming a space by using at least the base of the heat dissipating device and the case, wherein the electromagnetic interference with the electronic device is reduced within the space, and the plurality of supporting studs are attached to or are integral parts of the case and support the electronic device in the space on one end of each of the plurality of supporting studs for electrically isolating the electronic device and the case.

20. The method of claim 19, further comprising:

dissipating the heat generated by the electronic device by using a blower, wherein the blower is located on at least one side of the base of the heat dissipating device.

* * * * *